US012789463B2

(12) United States Patent
Wan et al.

(10) Patent No.: US 12,789,463 B2
(45) Date of Patent: Nov. 10, 2026

(54) METHOD, SYSTEM AND APPARATUS FOR PROCESSING SLICE IMAGE FOR 3D PRINTING, AND STORAGE MEDIUM

(71) Applicant: GUANGZHOU HEYGEARS IMC. INC, Guangzhou (CN)

(72) Inventors: Xin Wan, Guangzhou (CN); Yu Guo, Guangzhou (CN); Lingfeng Deng, Guangzhou (CN); Dachao Zhou, Guangzhou (CN); Juntao Guo, Guangzhou (CN); Hongquan Xiao, Guangzhou (CN)

(73) Assignee: GUANGZHOU HEYGEARS IMC. INC, Guangzhou (CN)

( * ) Notice: Subject to any disclaimer, the term of this patent is extended or adjusted under 35 U.S.C. 154(b) by 370 days.

(21) Appl. No.: 18/389,779

(22) Filed: Dec. 20, 2023

(65) Prior Publication Data

US 2024/0116250 A1 Apr. 11, 2024

Related U.S. Application Data

(63) Continuation-in-part of application No. PCT/CN2022/101638, filed on Jun. 27, 2022.

(30) Foreign Application Priority Data

Jun. 28, 2021 (CN) ......................... 202110720685.7
Aug. 30, 2021 (CN) ......................... 202111002866.2

(51) Int. Cl.
*B29C 64/386* (2017.01)
*B29C 64/20* (2017.01)
(Continued)

(52) U.S. Cl.
CPC ............ *B29C 64/386* (2017.08); *B29C 64/20* (2017.08); *B33Y 30/00* (2014.12); *B33Y 50/00* (2014.12);
(Continued)

(58) Field of Classification Search
CPC ..... B29C 64/386; B29C 64/20; B29C 64/124; B29C 64/393; B33Y 30/00; B33Y 50/00;
(Continued)

(56) References Cited

U.S. PATENT DOCUMENTS

2003/0033128 A1 2/2003 Nagano et al.
2004/0183796 A1 9/2004 Velde
(Continued)

FOREIGN PATENT DOCUMENTS

CN 104669625 A 6/2015
CN 105216330 A 1/2016
(Continued)

OTHER PUBLICATIONS

Ma et al. machine translation of CN-112706407-A (Year: 2021).*
(Continued)

*Primary Examiner* — Kee M Tung
*Assistant Examiner* — Xiaoming Wei
(74) *Attorney, Agent, or Firm* — The Sun IP Law

(57) ABSTRACT

Disclosed in the disclosure are a method, system and apparatus for processing slice image for 3D printing, and a storage medium. The method includes: acquiring a slice image of a three-dimensional model, and a relationship between a grayscale compensation parameter and a size adjustment value; determining at least one size adjustment value according to the slice image; determining at least one grayscale compensation parameter according to the at least one size adjustment value and the relationship between the grayscale compensation parameter and the size adjustment value; and respectively performing grayscale processing on edge pixels of corresponding contours in the slice image according to the plurality of grayscale compensation parameters, where the processed slice image is used for 3D printing.

19 Claims, 8 Drawing Sheets

(51) Int. Cl.

| | |
|---|---|
| ***B33Y 30/00*** | (2015.01) |
| ***B33Y 50/00*** | (2015.01) |
| ***G05B 19/04*** | (2006.01) |
| ***G06T 3/403*** | (2024.01) |
| ***G06T 7/11*** | (2017.01) |
| ***G06T 7/13*** | (2017.01) |
| ***G06T 19/20*** | (2011.01) |

(52) U.S. Cl.
CPC .......... *G05B 19/0405* (2013.01); *G06T 3/403* (2013.01); *G06T 7/11* (2017.01); *G06T 7/13* (2017.01); *G06T 19/20* (2013.01); *G06T 2219/2016* (2013.01)

(58) Field of Classification Search
CPC .... B33Y 50/02; B33Y 10/00; G05B 19/0405; G05B 2219/49008; G05B 19/4099; G06T 3/403; G06T 7/11; G06T 7/13; G06T 19/20; G06T 2219/2016
See application file for complete search history.

(56) References Cited

U.S. PATENT DOCUMENTS

| | | | | |
|---|---|---|---|---|
| 2005/0142024 | A1 | 6/2005 | Herzog | |
| 2008/0038396 | A1 | 2/2008 | John et al. | |
| 2009/0140466 | A1 | 6/2009 | Kuzusako et al. | |
| 2013/0095302 | A1 | 4/2013 | Pettis et al. | |
| 2014/0107823 | A1 | 4/2014 | Huang | |
| 2015/0224716 | A1 | 8/2015 | Hemani et al. | |
| 2016/0133050 | A1 | 5/2016 | Sakurai et al. | |
| 2016/0200042 | A1* | 7/2016 | Jeng | B29C 64/124 264/494 |
| 2017/0326786 | A1 | 11/2017 | Yuan et al. | |
| 2018/0162055 | A1 | 6/2018 | Biskop et al. | |
| 2018/0339446 | A1 | 11/2018 | Chen | |
| 2019/0022947 | A1 | 1/2019 | Ho | |
| 2019/0337219 | A1 | 11/2019 | Hou | |
| 2019/0351674 | A1 | 11/2019 | Stritzel | |
| 2022/0410483 | A1* | 12/2022 | Wang | B33Y 10/00 |

FOREIGN PATENT DOCUMENTS

| | | | | | |
|---|---|---|---|---|---|
| CN | 106584844 | A | | 4/2017 | |
| CN | 107297902 | A | | 10/2017 | |
| CN | 107718535 | A | | 2/2018 | |
| CN | 107756814 | A | | 3/2018 | |
| CN | 107877852 | A | | 4/2018 | |
| CN | 107972266 | A | | 5/2018 | |
| CN | 108327253 | A | | 7/2018 | |
| CN | 108555301 | A | | 9/2018 | |
| CN | 109719954 | A | | 5/2019 | |
| CN | 110126266 | A | | 8/2019 | |
| CN | 110142959 | A | | 8/2019 | |
| CN | 110435154 | A | | 11/2019 | |
| CN | 110722159 | A | | 1/2020 | |
| CN | 111168999 | A | | 5/2020 | |
| CN | 111186140 | A | | 5/2020 | |
| CN | 111497231 | A | | 8/2020 | |
| CN | 112519233 | A | | 3/2021 | |
| CN | 112677487 | A | | 4/2021 | |
| CN | 112706407 | A | * | 4/2021 | B29C 64/386 |
| CN | 112959661 | A | | 6/2021 | |
| CN | 112976582 | A | | 6/2021 | |
| CN | 113001707 | A | | 6/2021 | |
| WO | 2017062630 | A1 | | 4/2017 | |
| WO | 2019173000 | A1 | | 9/2019 | |
| WO | 2021068386 | A1 | | 4/2021 | |

OTHER PUBLICATIONS

The search report of counterpart EP application No. 22831986.9 issued on May 8, 2025.
The extended European search report of corresponding EP application No. 24155445 was issued on Jul. 29, 2024.
The search report of the priority CN patent application No. 202111002866.2 dated Feb. 7, 2024.
ISR for PCT/CN2022/101638 mailed Sep. 21, 2022.

* cited by examiner

Fig 10
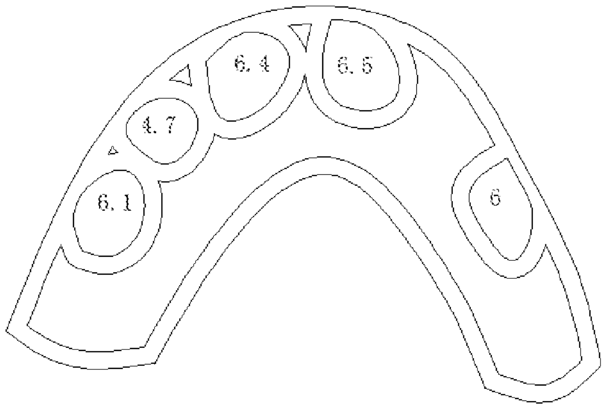
Fig 11
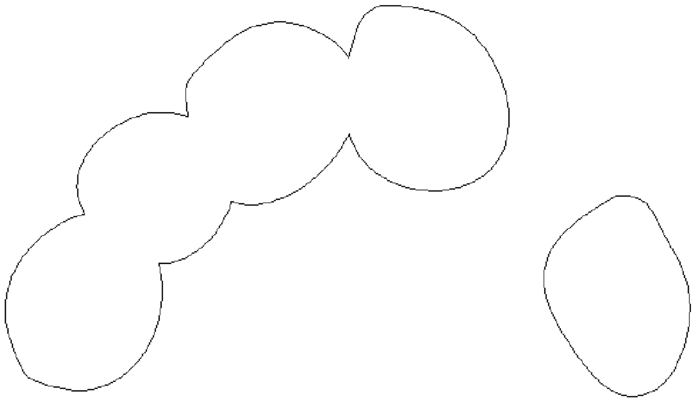
Fig 12
| | | | | | |
|---|---|---|---|---|---|
| Q 11 | Q 12 | ... | | | |
| | | | | | |
| | | | | | |
| | | | | | |
| Q 51 | | | | | Q 56 |

METHOD, SYSTEM AND APPARATUS FOR PROCESSING SLICE IMAGE FOR 3D PRINTING, AND STORAGE MEDIUM

CROSS-REFERENCE TO RELATED APPLICATION

The disclosure claims priority to Chinese Patent Application No. 202110720685.7 filed to the China National Intellectual Property Administration on Jun. 28, 2021 and entitled "Curing Processing Method, System and Apparatus for 3D Printing, and Storage Medium", and claims priority to Chinese Patent Application No. 202111002866.2 filed to the China National Intellectual Property Administration on Aug. 30, 2021 and entitled "3D Printing Method, System and Apparatus for 3D Printing, and Storage Medium", the disclosure of which are hereby incorporated by reference in their entirety.

TECHNICAL FIELD

The disclosure relates to the technical field of 3D printing, and in particular, to a method, system and apparatus for processing a slice image for 3D printing, and a storage medium.

BACKGROUND

Photocuring 3D printing is the earliest 3D printing and molding technology. Face exposure type photocuring 3D printing is one of the branches of photocuring 3D printing. The technology uses the principle of curing a liquid photosensitive resin after irradiating the liquid photosensitive resin with a light projector. Software is used to slice a three-dimensional digital model of a printout, so as to obtain several slice images. Then the several slice images are successively projected by means of the light projector with a certain wavelength, so as to cause the photosensitive resin to be cured into cured sheets corresponding to the slice images, and the cured sheets are stacked layer by layer, so as to form a three-dimensional object.

In an actual operation, a user needs to trim the size of the printout due to various reasons (for example, to compensate for curing contraction of the photosensitive resin). Specifically, size adjustment is performed on the three-dimensional digital model of the printout or the slice images, and an adjustment mode may be to inward or outward offset an image contour of the model. However, such size adjustment mode can only meet the adjustment of a large size; and if a size adjustment parameter is less than a pixel size, an accurate size adjustment requirement cannot be met. In addition, size contraction occurs when a photosensitive resin material is cured. Generally, if the size of an exposure surface is larger, the contraction of the material is larger. In addition, problems such as printing residues may be caused by continuous exposure of a large-area solid exposure surface, thereby affecting printing accuracy and a printing effect.

SUMMARY

In view of this, the embodiments of the disclosure are intended to provide a method, system and apparatus for processing a slice image for 3D printing, and a storage medium, which can meet an accurate size adjustment requirement by compensating on edge pixels of the slice image.

According to a first aspect, an embodiment of the disclosure provides a method for processing a slice image for 3D printing. The method includes the following operations.

A slice image of a three-dimensional model, and a relationship between a grayscale compensation parameter and a size adjustment value are acquired; and a size adjustment value is determined according to the slice image.

A grayscale compensation parameter is determined according to the size adjustment value and the relationship between the grayscale compensation parameter and the size adjustment value.

Grayscale processing is respectively performed on edge pixels of a contour in the slice image according to the grayscale compensation parameter, and the processed slice image is used for 3D printing.

According to a second aspect, an embodiment of the disclosure provides a system for processing a slice image for 3D printing. The system includes an acquisition module, a first calculation module, a second calculation module, and a printing module.

The acquisition module is configured to acquire a slice image of a three-dimensional model, and a relationship between a grayscale compensation parameter and a size adjustment value.

The first calculation module is configured to determine a size adjustment value according to the slice image.

The second calculation module is configured to determine a grayscale compensation parameter according to the size adjustment value and the relationship between the grayscale compensation parameter and the size adjustment value.

The printing module is configured to respectively perform grayscale processing on edge pixels of a contour in the slice image according to the grayscale compensation parameter, wherein the processed slice image is used for 3D printing.

According to a third aspect, an embodiment of the disclosure provides a 3D printing method. The method includes the method for processing the slice image for 3D printing.

The method further includes the following operation.

3D printing is performed on the processed slice image.

As at least one alternative embodiment, before the slice images are separated to obtain the contour region, and the filling region that is defined in the contour region, the method for processing the slice image for 3D printing further comprises: slicing the three-dimensional model to generate a series of slice images; and selecting at least two consecutive slice images from the series of slice images; and separating the slice images to obtain the contour region, and the filling region that is defined in the contour region, and segmenting the filling region into the several sub-regions comprises: separating the selected slice images to obtain contour regions, and filling regions that are defined in the contour regions, and segmenting the filling regions into the several sub-regions.

As at least one alternative embodiment, the contour region and the filling region are overlapped as to form an overlap area; or the contour region and the filling region are non-overlapped with each other.

As at least one alternative embodiment, a width of the overlap area is 1-10 mm.

As at least one alternative embodiment, segmenting the filling regions into the several sub-regions comprises: segmenting the filling regions into the several sub-regions that are in closed shapes.

As at least one alternative embodiment, segmenting the filling regions into the several sub-regions comprises: segmenting the filling regions into the several sub-regions that have an equal area and are in closed shapes.

As at least one alternative embodiment, segmenting the filling regions into the several sub-regions comprises: segmenting the filling regions into the several sub-regions that are in closed shapes according to at least one of following: features of the filling regions, distances from the contour regions, and a preset performance condition; wherein areas of at least part of the sub-regions are different from each other.

As at least one alternative embodiment, the several sub-regions obtained by segmenting the filling regions comprise: complete square sub-regions that are distributed in the filling regions and incomplete square sub-regions that are distributed close to a boundary of the filling regions.

As at least one alternative embodiment, the contour region is a boundary of the sub-regions, and is free from an offset along with the sub-regions.

As at least one alternative embodiment, the adjacent sub-regions of the adjacent slice images are partially overlapped in the perpendicular direction by means of the following step: offsetting, by a preset distance, the sub-regions of the adjacent slice images at the same position in the perpendicular direction along a preset direction.

As at least one alternative embodiment, a position offset is set to a cyclic mode, wherein the cyclic mode refers to that as a print layer thickness increases, the number of times of a cycle required for a square to return to an original position is decreased.

As at least one alternative embodiment, the method further comprising: if the current slice image has an exposed filling region compared to the first several or last several slice images of the current slice image, determining the exposed filling region as a model outer surface region without being performed sub-region segmentation on.

As at least one alternative embodiment, the method further comprising: setting a curing depth of the contour region to be greater than or equal to a curing depth of the filling region.

As at least one alternative embodiment, the method further comprising: controlling a light projector to expose based on the contour region and the filling region of the each slice image.

As at least one alternative embodiment, controlling the light projector to expose based on the contour region and the filling region of the each slice image comprises one of following: exposing the contour region firstly, then exposing the filling region; exposing the filling region firstly, then exposing the contour region; exposing the filling region and the contour region at the same time.

As at least one alternative embodiment, when exposing the filling region and the contour region at the same time, an exposure intensity and/or exposure time of the contour region is greater than that of the filling region.

As at least one alternative embodiment, the filling region and the contour region are cured by using different light sources.

As at least one alternative embodiment, the different light sources comprise a point light source corresponding to the contour region and a face light source corresponding to the filling region.

According to a fourth aspect, an embodiment of the disclosure provides an apparatus for processing a slice image for 3D printing. The apparatus for processing the slice image for 3D printing includes at least one processor and at least one memory.

The at least one memory is configured to store at least one program.

When the at least one program is executed by the at least one processor, the at least one processor is enabled to implement the method for processing the slice image for 3D printing.

According to a fifth aspect, an embodiment of the disclosure provides a storage medium. The storage medium stores a program that is executable by a processor. When being executed by the processor, the program executable by the processor is configured to execute the method for processing the slice image for 3D printing.

According to a sixth aspect, an embodiment of the disclosure provides a system for processing a slice image for 3D printing. The system includes a printing unit and a computer device connected to the printing unit.

The printing unit is configured to print a three-dimensional model according to an instruction.

The computer device includes at least one processor and at least one memory.

The at least one memory is configured to store at least one program.

When the at least one program is executed by the at least one processor, the at least one processor is enabled to implement the method for processing the slice image for 3D printing.

The embodiments of the disclosure include the following beneficial effects. According to the embodiments of the disclosure, the size adjustment value is first determined according to the slice image of the three-dimensional model, and the grayscale compensation parameter is then determined according to the size adjustment value and the relationship between the grayscale compensation parameter and the size adjustment value; and then grayscale processing are respectively performed on the edge pixels of the contour in the slice image according to the grayscale compensation parameter, and 3D printing is performed. That is to say, an accurate size adjustment requirement is met by compensating the edge pixels of the slice image.

BRIEF DESCRIPTION OF THE DRAWINGS

FIG. 10 is a schematic diagram of a result of identifying the diameter of an assembly hole contour according to an embodiment.

FIG. 11 is a schematic diagram of a result of identifying a closed image block corresponding to the position of an assembly hole contour according to an embodiment.

FIG. 12 is a distribution diagram of format regions according to an embodiment.

DETAILED DESCRIPTION OF THE EMBODIMENTS

The disclosure is further described in detail below with reference to the accompanying drawings and specific embodiments. The numbering of steps in the following embodiments are only for the convenience of exposition and description, there is no limitation on the sequence among the steps, and an execution sequence of the steps in the embodiments may be adaptively adjusted according to the understanding of the person skilled in the art.

It should be understood that the use of the terms "a plurality of" and "several" are to be interpreted as meaning that there is at least one item, that is, there is one or more items.

Figure 1:
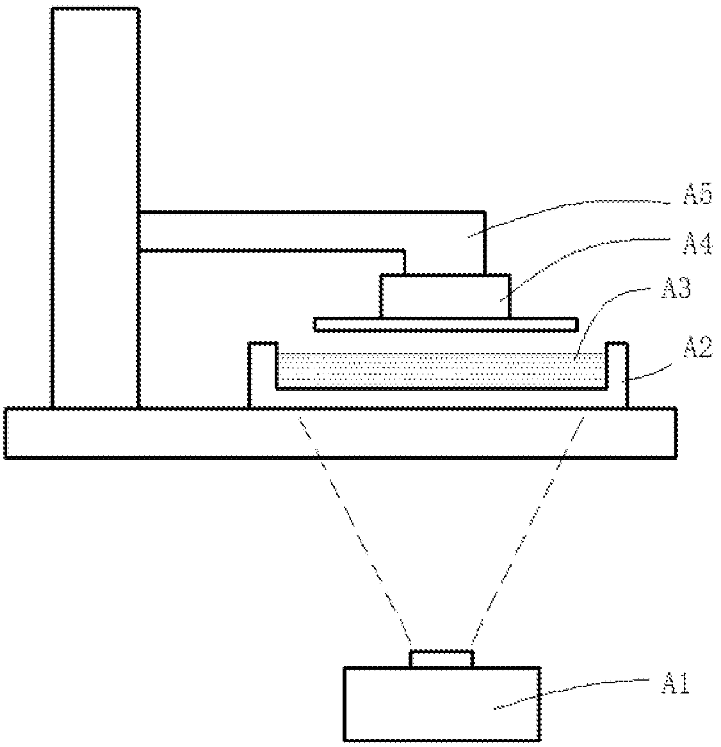
FIG. 1 is a schematic structural diagram of a system for processing a slice image for 3D printing according to an embodiment.

As shown in FIG. 1, a photocuring 3D printing system includes a light projector A1 and a 3D printer. The 3D printer includes a material tray A2 configured to contain a photosensitive resin material A3, a molding platform A4, and an elevating mechanism A5. A supporting structure at the bottom of the material tray A2 is a transparent structure. A three-dimensional digital model to be printed is sliced to obtain several slice images; the light projector A1 successively projects the slice images, such that the photosensitive resin material A3 in the material tray A2 are successively cured, on the molding platform A4, into cured sheets corresponding to the slice images, and the cured sheets are stacked layer by layer, so as to form a three-dimensional digital model solid; and when the cured sheets are formed each time, the elevating mechanism correspondingly elevates a certain height.

Figure 2:
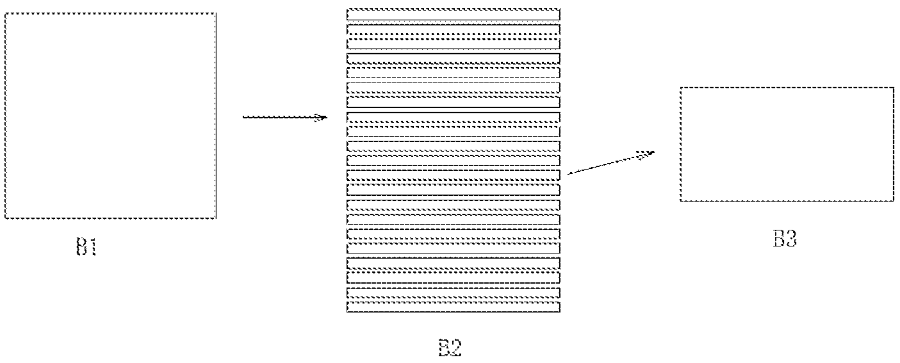
FIG. 2 is a slicing flowchart of a three-dimensional model according to an embodiment.

As shown in FIG. 2, B1 is a top view of a three-dimensional digital model to be printed. The three-dimensional digital model is sliced to obtain a plurality of slice images B2; and the slice image of one of the plurality of slice images B2 is B3.

It is to be noted that, the method for processing the slice image for 3D printing of the embodiments of the disclosure may be applied to photocuring three-dimensional printing. The photocuring three-dimensional printing includes Stereo Lithography Appearance (SLA), Digital Light Processing (DLP), Liquid Crystal on Silicon (LCOS), and Liquid Crystal Display (LCD) photocuring printing, and may also be face exposure type photocuring printing, such as DLP, LCOS, and LCD.

Figure 3:
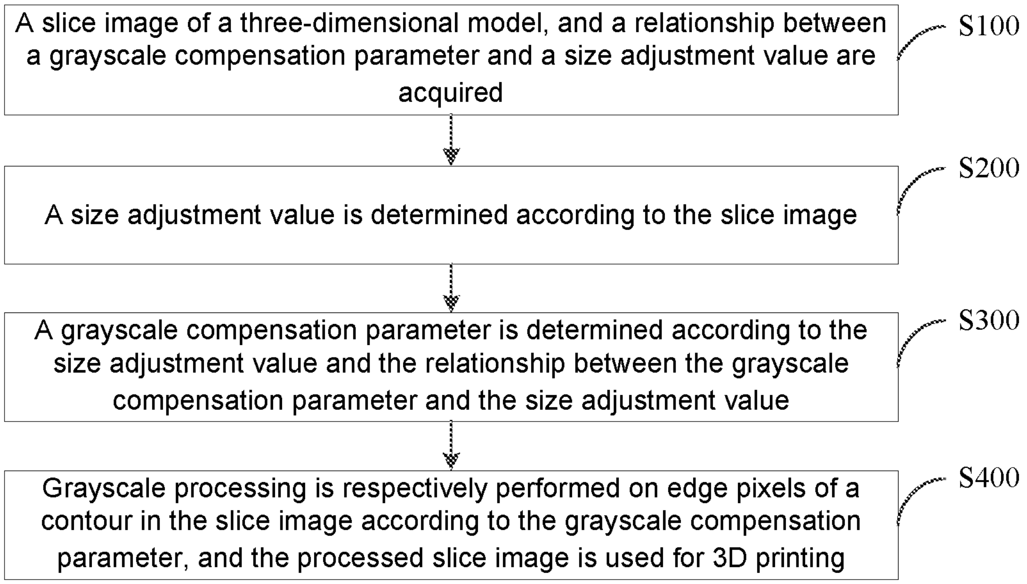
FIG. 3 is a schematic diagram of a step process of a method for processing a slice image for 3D printing according to an embodiment.

As shown in FIG. 3, an embodiment of the disclosure provides a method for processing a slice image for 3D printing. The method includes the following steps.

At S100, a slice image of a three-dimensional model, and a relationship between a grayscale compensation parameter and a size adjustment value are acquired.

For example, the three-dimensional model is a three-dimensional digital model of a printout. A plurality of slice images may be obtained by slicing the three-dimensional digital model. The slice images are successively projected by means of a light source with a certain wavelength, so as to cause photosensitive resin to be cured into cured sheets corresponding to the slice images, and the cured sheets are stacked layer by layer, so as to form a three-dimensional solid which is the printout.

Due to various reasons (for example, curing contraction of the photosensitive resin) during printing, there is a size deviation between the size of the printout and the slice images of the three-dimensional model, such that the size of the printout needs to be trimmed. For example, the slice images of the three-dimensional model are processed, so as to compensate the size deviation between the printout and the slice images.

Figure 4:
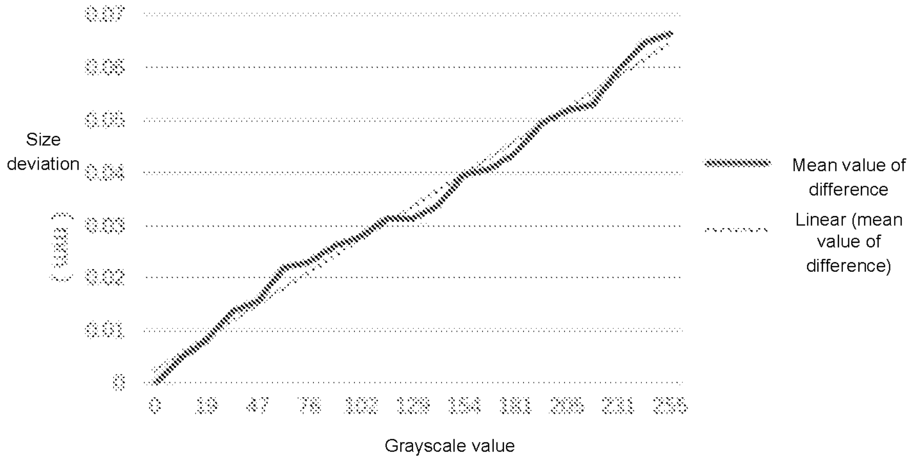
FIG. 4 is a curve of the relationship between a grayscale compensation parameter and a print size deviation value according to an embodiment.

It is to be noted that, through extensive experiments, it has been proven that, after grayscale adjustment is performed on a model contour edge of a single slice image, a contour size of the model in the cured sheet is changed, and there is a positive correlation between a grayscale adjustment parameter and the size adjustment value. As shown in FIG. 4, a solid line in the figure represents a relationship curve of an actual measured grayscale value and a mean value of a difference of the size deviation, and a dotted line is a positive correlation curve of a fitted grayscale value and the size deviation. After corresponding grayscale processing is performed on an outermost pixel of the model contour edge, the contour size of the model (that is, a solid three-dimensional model) in the cured sheet may be adjusted. The accuracy of size adjustment may be controlled within a non-integer multiple pixel size range, for example, the size may be adjusted to a corresponding size such as 0.1 pixels, 1.2 pixels, and 10.8 pixels. The adjustment of a non-integer multiple pixel size is to perform different grayscale superposition (for example, when a grayscale in the single pixel is 0-225) in pixels after the edge of a contour map is identified, so as to achieve the adjustment of the non-integer multiple pixel size. In an example with 1.6 pixels needing to be dilated, a 100% (255) grayscale is superposed to a first pixel on an outer edge on the basis of the contour map, and a 60% (153) grayscale value is superposed to a second pixel. In another example with 1.6 pixels needing to be dilated, and a 100% (255) grayscale is superposed to the first pixel on the outer edge on the basis of the contour map, a 40% (102) grayscale value is superposed to the second pixel, and a 20% (51) grayscale value is superposed to a third pixel. It is to be noted that, in this embodiment, the number of pixels when grayscale superposition is performed in pixels is not limited, and the grayscale values of pixel superposition from outside to inside are decreased progressively on the basis of the contour map.

For example, the relationship between the grayscale compensation parameter and the size adjustment value may be obtained from a relationship curve of the grayscale compensation parameter and the size adjustment value; and the relationship between the grayscale compensation parameter and the size adjustment value may also be a discrete point diagram correspondence relationship. For example, corresponding grayscale adjustment parameters are detected according to the several size adjustment values, such that the relationship between the grayscale compensation parameter and the size adjustment value are obtained.

It is to be noted that, the size adjustment value includes, but is not limited to, a specific numerical value of size enlargement or reduction, and a ratio of size enlargement or reduction. When the size adjustment value is the specific numerical value of size enlargement or reduction, the relationship between the grayscale compensation parameter and the size adjustment value may be a curve graph shown in FIG. 4; and when the size adjustment value is the ratio of size enlargement or reduction, the relationship between the grayscale compensation parameter and the size adjustment value may be a mapping table of the grayscale compensation parameter and the ratio of size enlargement or reduction, and may also be a curve graph. That is to say, in this embodiment, the form of the relationship between the grayscale compensation parameter and the size adjustment value is not limited.

It is understandable by a person skilled in the art that, the relationship curves corresponding to different pixel accuracies are slightly different. However, through a plurality of experiments, it has been proven that, the relationship curves corresponding to different pixel accuracies all represent a positive correlation. Acquiring the relationship curve of the grayscale compensation parameter and the size adjustment value is specifically acquiring a relationship curve corresponding to a pixel accuracy of the light projector.

At S200, a size adjustment value is determined according to the slice image.

After the relationship between the grayscale compensation parameter and the size adjustment value is obtained, the size adjustment value needs to be further determined, and the grayscale compensation parameters are further confirmed in sequence. In some embodiments of the present application, the size adjustment value may be acquired by means of self-inputting by a user, and is set according to an actual requirement of the user. For example, in this embodiment, the size adjustment value may be determined by identifying the slice image.

In an embodiment, the step of determining the size adjustment value according to the slice image includes: determining at least one size adjustment value according to the slice image.

Figure 5:
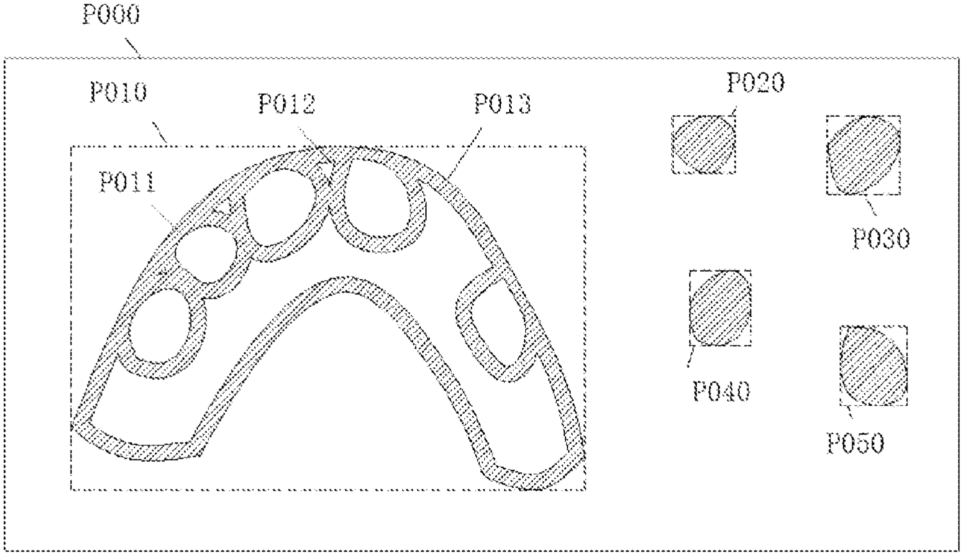
FIG. 5 is a schematic structural diagram of a slice image according to an embodiment of the disclosure.

It is to be noted that, one slice image may include a plurality of slice shapes. For example, one slice image involves a plurality of three-dimensional models; and one slice shape may include a plurality of contours, for example, an outer contour and a plurality of inner contours. Each contour may correspond to different grayscale compensation parameters. Referring to FIG. 5, P000 represents one slice image; P010 represents the slice shape A; P020 represents the slice shape B; P030 represents the slice shape C; P040 represents the slice shape D; P050 represents the slice shape E; P011 represents the contour 1 in the slice shape A; P012 represents the contour 2 in the slice shape A; and P013 represents the contour 3 in the slice shape A. It may be learned from FIG. 5 that, the slice image includes 5 slice shapes.

In an embodiment, the step of determining at least one size adjustment value according to the slice image includes the following steps.

At S201, at least one slice shape in the slice image is identified.

At S202, contour identification is respectively performed on each slice shape, and the corresponding size adjustment value is determined according to an identified contour.

For example, referring to FIG. 5, first, when the slice shapes in the slice image are identified, the each slice shape is enveloped by a corresponding rectangular frame in a plurality of rectangular frames, a plurality of image blocks are segmented on the slice shapes according to the rectangular frames, and each image block corresponds to one slice shape; and then contour identification is performed on the each slice shape, and the corresponding size adjustment value is determined according to the identified contour.

Figure 6:
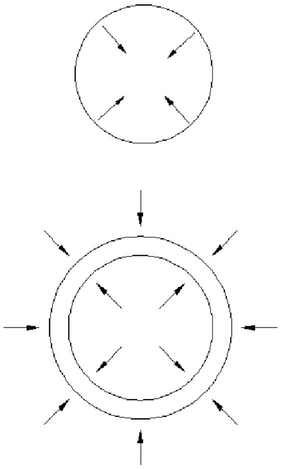
FIG. 6 is a schematic diagram of a contraction direction of an inner contour and an outer contour according to an embodiment.
Figure 7:
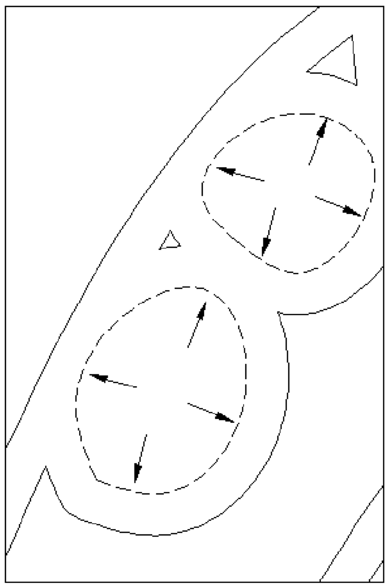
FIG. 7 is a diagram of a deviation trend of a design size and an actual size according to an embodiment.

Due to curing contraction of photosensitive resin, as shown in FIG. 6, there may be a deviation between a printed part size and a design size, and the arrow represents a contraction direction. As shown in FIG. 7, since the Z-axis cross-sectional width and aperture of a part are different, a final contraction size is also different. In a dental application case, the aperture of a printed segmented die (abutment tooth model) does not match the design size. When the design aperture of the part is small, an actual print aperture is too small, resulting in too tight fitting; and when the design aperture of the part is large, the actual print aperture is too large, resulting in too loose fitting and insufficient accuracy. The arrow represents a deviation direction. Therefore, appropriate trimming needs to be performed on the inner contour or the outer contour of the model, so as to compensate a size deviation during actual molding. For example, for an assembly hole, an assembly rod, an assembly column, an assembly pile, matching holes and columns, or irregular shapes may be adjusted for size deviation by means of grayscale compensation and grayscale bias. Grayscale bias processing is to increase or reduce the grayscale of the edge contour.

Using the relationship between the grayscale adjustment parameter and the size adjustment value to solve the problem of size deviation caused by curing contraction of material has outstanding beneficial effect. The size adjustment value may be determined according to the slice image. A specific determination mode is determined according to an actual application. This embodiment is not specifically limited thereto.

In an embodiment, the step of respectively performing contour identification on the each slice shape, and determining the corresponding size adjustment value according to the identified contour includes the following step.

At S210, the contour of the each slice shape is identified, and the size of the contour is calculated.

For example, the contour of the slice shape includes an inner contour or an outer contour. For example, the contour of the assembly hole is an inner contour, the contour of the assembly rod is an outer contour, the contour of the assembly column is an outer contour, and the contour of the assembly pile is an outer contour.

In an embodiment, the contour includes an inner contour and an outer contour. The step of identifying the contour of the each slice shape, and calculating the size of the contour includes: identifying the inner contour or the outer contour of the each slice shape, and calculating the size of the inner contour or the size of the outer contour.

As at least one alternative embodiment, in 3D printing, a solid image is an image that is configured to directly mold a printing product required by a user. For a non-solid image, according to an application scenario of the three-dimensional model, the non-solid image may be an image that is configured to mold an auxiliary structure instead of an image that is directly configured to mold the printing product. The non-solid image may include a supporting structure image and a base plate structure image.

In an embodiment, the step of identifying the inner contour or the outer contour of the each slice shape includes the following steps.

At S211, a solid image in the each slice shape is identified according to a position attribute of the each slice shape.

At S212, an inner contour or an outer contour in the solid image is extracted.

In an embodiment, the step of filtering the assembly hole contour from the closed inner contour or filtering the assembly rod contour from the closed outer contour according to a contour geometry constraint condition includes the following step.

At S2121, the assembly hole contour is filtered from the closed inner contour or the assembly rod contour is filtered from the closed outer contour according to a constraint condition, wherein the constraint condition includes at least one of the following conditions: a constraint condition of a center set, a constraint condition of a contour area, a constraint condition of an ellipse area ratio, a constraint condition of a contour aspect ratio, and a constraint condition of conforming to a convex polygon.

Figure 8:
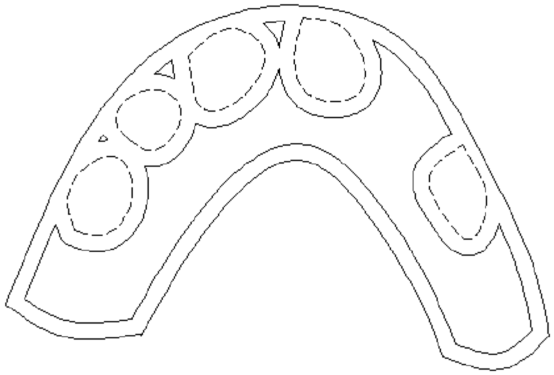
FIG. 8 is a schematic structural diagram of a die hole contour filtered from a closed contour according to an embodiment.

As at least one alternative embodiment, all closed inner contours may be searched in the slice image by means of extracting the contour tree. The contour geometry constraint condition includes, but is not limited to, a center set, a hole contour area, an ellipse area ratio, a contour aspect ratio, and conforming to a convex polygon. By means of the contour geometry constraint condition, all hole contours are filtered from the plurality of closed contours. Details are shown in FIG. 8, dotted portions are the assembly hole obtained through identification.

Figure 9:
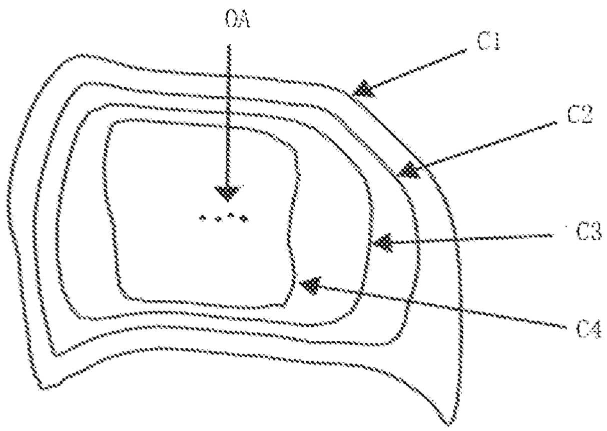
FIG. 9 is a schematic structural diagram of a closed contour that is identified according to a constraint condition of a center set according to an embodiment.

It is to be noted that, as shown in FIG. 9, the constraint condition for the center set means that whether central points of the plurality of overlapped (not in the same slice image) closed contours in an Z-axis direction (which specifically may be a direction perpendicular to a slice layer) are all in the same closed contour, where C1 represents a first layer, C2 represents a second layer, C3 represents a third layer, C4 represents a fourth layer, and OA represents the central point of an ellipse of each layer. The constraint condition for the hole contour area means that there is a certain range of the size of a hole, and limitation is performed according to upper and lower area limits corresponding to the range. The constraint condition for the ellipse area ratio means that a contour line is fitted into an ellipse, and an internal area of the contour line is calculated at the same time; whether the constraint condition for the ellipse area ratio is met is determined according to the ratio of the internal area to an ellipse area, and if the ratio is less than a first preset value, it is considered that the constraint condition for the ellipse area ratio is met. The constraint condition for the contour aspect ratio means that there is a certain range for the aspect ratio of the hole; and when the aspect ratio exceeds the certain range, it is considered that the constraint condition for the contour aspect ratio is not met. The constraint condition of conforming to a convex polygon means that one of hole features is an essentially approximate irregular ellipse.

At S220, a size grade is determined according to the size, and the corresponding size adjustment value is determined according to the size grade.

In an embodiment, the step of determining the size grade according to the size, and determining the corresponding size adjustment value according to the size grade includes: determining the size grade according to the size of the inner contour, and determining the size adjustment value corresponding to the inner contour according to the size grade of the inner contour, or determining the size grade according to the size of the outer contour, and determining the size adjustment value corresponding to the outer contour according to the size grade of the outer contour.

As at least one alternative embodiment, on the basis of the size grade of the outer contour or the inner contour, the corresponding size adjustment value is matched, and grayscale processing is performed on the assembly hole contour according to the size adjustment method described above.

In an embodiment, the step of determining the size grade according to the size, and determining the corresponding size adjustment value according to the size grade includes the following steps.

At S221, the size grade is determined according to the size and a preset size grading condition.

At S222, the size is adjusted according to the size grade and a preset size grade adjustment plan, so as to determine the corresponding size adjustment value, wherein the size grade adjustment plan includes reducing a size, keeping the size unchanged, and increasing the size.

Referring to FIG. 10, the size of the assembly hole contour is specifically an average ellipse diameter of the assembly hole contour. According to a preset size grading condition, the corresponding grayscale compensation parameter is matched for the assembly hole contour within a preset size range, so as to match a corresponding grayscale compensation operation.

For example, when the average ellipse diameter of the contour is less than a, assembly is too tight, the size of the contour is decreased, and grayscales need to be reduced; when the average ellipse diameter of the contour is in a range [a, b], the assembly is appropriate, the size of the contour is unchanged, and the grayscales do not need to be adjusted; and when the average ellipse diameter of the contour is greater than b, the assembly is too loose, the size of the contour is increased, and the grayscales needs to be increased.

During grayscale processing, a thickness range involved in grayscale processing is a pixel on the edge of the assembly hole contour; and a mask image is generated according to the corresponding grayscale compensation parameter, so as to perform grayscale superposition on edge pixels of the assembly hole contour.

In an embodiment, the method for processing the slice image for 3D printing further includes the following steps.

At S213, after an assembly hole contour or an assembly rod contour of one slice image is identified, the assembly hole contour or the assembly rod contour is dilated, so as to obtain a closed image block corresponding to the assembly hole contour or a closed image block corresponding to the assembly rod contour.

At S214, an assembly hole contour of a slice image adjacent to the slice image is identified according to the closed image block corresponding to the assembly hole contour, or, an assembly rod contour of the slice image adjacent to the slice image is identified according to the closed image block corresponding to the assembly rod contour.

After the assembly hole of the slice image is identified, all assembly hole contours of the slice image are dilated, so as to obtain the closed image blocks corresponding to the positions of all the assembly holes of the slice image shown in FIG. 11. By using these closed image blocks, rapid positioning and rapid identification of the assembly hole contours are performed on other slice images that are arranged above or under the current slice image.

As at least one alternative embodiment, the assembly rod contour and the assembly hole contour have a different identification mode. Since the bottom of an assembly rod may be added support structures, so as to be hung, the outer contour of the assembly rod does not appear at a first layer, such that contour identification needs to be performed on images at each layer, after the contour is identified, dilation processing is performed, and other layers are identified; and the assembly hole contour may be found at the first layer, after the contour is identified, dilation processing is performed, and other layers are identified.

It is understandable by a person skilled in the art that, an assembly hole in a three-dimensional solid has a certain depth. After the three-dimensional model is sliced, the contour shapes of the assembly holes in the plurality of slice images are similar (for example, an overlapping effect or a covering effect is shown in a top view) and contour positions are similar. Therefore, using the closed image blocks as a constraint condition of identifying the assembly hole contour of the adjacent slice image is rational and convenient.

At S300, a grayscale compensation parameter is determined according to the size adjustment value and the relationship between the grayscale compensation parameter and the size adjustment value.

As at least one alternative embodiment, after the size adjustment value is determined, a first grayscale compensation parameter of the size adjustment value may be correspondingly determined according to the relationship curve of the size adjustment value and the grayscale compensation parameter.

It is to be noted that, the size adjustment value may be determined, and the grayscale compensation parameter is determined accordingly, so as to be used as a grayscale compensation parameter of all edge pixels of the contours in the slice image.

In an embodiment, the step of determining the grayscale compensation parameter according to the size adjustment value and the relationship between the grayscale compensation parameter and the size adjustment value includes: determining at least one grayscale compensation parameter according to the at least one size adjustment value and the relationship between the grayscale compensation parameter and the size adjustment value.

As at least one alternative embodiment, one size adjustment value may be determined according to each contour in the slice image, and the grayscale compensation parameter is determined for each size adjustment value, so as to obtain at least one grayscale compensation parameter.

At S400, grayscale processing is respectively performed on edge pixels of a contour in the slice image according to the grayscale compensation parameter, and the processed slice image is used for 3D printing.

The edge pixels refer to pixels in the contour region in the slice image.

As at least one alternative embodiment, after grayscale processing is performed on the edge pixels of the slice image according to the determined first grayscale compensation parameter, 3D printing is performed on the slice image after grayscale processing, such that the print size of the slice image can better meet an actual application requirement. Further, 3D printing may also be performed on the processed slice image.

As at least one alternative embodiment, when the size adjustment value is determined, and one grayscale compensation parameter is determined accordingly, grayscale processing is performed on all the edge pixels of the contours in the slice image by means of the grayscale compensation parameter, so as to improve processing efficiency.

In an embodiment, the step of respectively performing grayscale processing on the edge pixels of the contours in the slice image according to the grayscale compensation parameter includes: respectively performing grayscale processing on the edge pixels of the corresponding contours in the slice image according to the at least one grayscale compensation parameter, where the processed slice image is used for 3D printing.

As at least one alternative embodiment, one size adjustment value may be determined according to each contour in the slice image, and the grayscale compensation parameter is determined for each size adjustment value, so as to obtain at least one grayscale compensation parameter; and grayscale processing is performed on the edge pixels of the corresponding contour by using each grayscale compensation parameter, so as to improve processing accuracy.

The embodiments of the disclosure include the following beneficial effects. According to the embodiments of the disclosure, the size adjustment value is first determined according to the slice image, and the grayscale compensation parameter is then determined according to the size adjustment value and the determined relationship between the grayscale compensation parameter and the size adjustment value; and then grayscale processing and 3D printing are performed on the edge pixels of the contour in the slice image according to the grayscale compensation parameter. That is to say, an accurate size adjustment requirement is met by compensating the edge pixels of the slice image.

The above size adjustment mode is only on the basis of the modification of front-end data, and does not take into account the influence of a back-end printing device, and the pixel accuracy and printing format of different printing devices may be different, resulting in a certain influence on size adjustment.

In an embodiment, the method for processing the slice image for 3D printing further includes the following step.

At S001, the corresponding size adjustment value is determined according to one or more of a shape parameter, a region parameter, a material parameter, a temperature parameter, or an application type of the each slice shape.

It is to be noted that, depending on the shape parameter is to realize the purpose of adaptively matching size adjustment parameters according to the complexity of the contour shape. Depending on the region parameter is because there may be at least one functional region and/or a non-functional region on a printout, and some functional regions does not need to store size compensation. For example, the slice shape includes an outer contour and a plurality of inner contours, but partial small inner contours of the outer contour are in the non-functional region, and grayscale compensation does not need to be performed, such that there is no further follow-up operations such as size grading. For the material parameter, different materials have different curing characteristics, and the degree of curing contraction of the material is also different, such that the grayscale adjustment parameter and the size adjustment value are also different. The application type is an application scenario of the printout. The application scenario may correspond to the material parameter. Some materials are developed for a specific application scenario.

As at least one alternative embodiment, during photocuring printing, there is a problem of overall size contraction of a material during conversion from a liquid state to a solid state. A zoom factor in an XY direction is added to slice data for size compensation at a previous processing step. Different materials correspond to different zoom factors. For example, 0.003 size contraction exists in the XY direction of a certain material, and the zoom factor in the XY direction is adjusted to 1.003 correspondingly at the previous processing step, so as to compensate size contraction. The factor adjustment is effective to the entire model, which is to zoom in and out of the entire slice image, primarily to compensate for the overall contraction of the material. In combination with the accurate adjustment effect generated by the first grayscale compensation parameter on an image size, the adjustment of the size of the printout is more convenient.

In an embodiment, the method for processing the slice image for 3D printing further includes the following step.

At S002, the offset of a projection point is converted into the offset of a pixel point, and reverse distortion processing is performed according to the offset of the pixel point and the slice image.

As at least one alternative embodiment, due to a device installation error or the influence of lens optical distortion, an actual projection image corresponding to the slice image is deformed, such that a light projecting device for projection needs to be calibrated. The offset of each pixel point is converted by means of the offset of the projection point, and specific steps are as follows.

At step one, the light projecting device projects an initial projection drawing corresponding to the slice image to a projection platform, a calibration board is placed on the projection platform, and the projection platform is photographed. The shape of the projection drawing is the same as the shape on the calibration board; the shape is a dot matrix; and points may be rectangular or circular.

At step two, calibration point coordinates and actual projection point coordinates are identified according to a photographed image, so as to obtain a calibration point matrix and an actual projection point matrix.

At step three, a rotation translation operation is performed on the calibration point matrix and/or the actual projection point matrix, a calibration point and an actual projection point are converted into the same image coordinate system, and then a spacing value TO of the calibration point and the actual projection point in the image coordinate system is calculated.

As at least one alternative embodiment, the same image coordinate system may be a coordinate system where the calibration point coordinates are located, or may be a coordinate system where the actual projection point coordinates are located, or may be an image coordinate system other than the coordinate system where the calibration point coordinates are located and the coordinate system where the actual projection point coordinates are located.

At step four, the $T_0$ in the image coordinate system is converted into an offset $C_1$ in a pixel coordinate system, and reverse distortion processing is performed on the initial projection drawing according to the offset $C_1$, where both the $T_0$ and the $C_1$ are matrices formed by vectors.

Before the slice image is projected (that is, 3D printing being performed on the slice image), the $C_1$ is first acquired by means of the calibration method; and reverse distortion processing is then performed on the projection drawing according to the $C_1$. That is, the slice image is calibrated to avoid the influence on the size of the printout due to the device installation error or the lens optical distortion, such that the adjustment of the size of the printout is more accurate.

In an embodiment, the method for processing the slice image for 3D printing further includes the following steps.

At S0031, a light projector is controlled to project light on a format, and measure format light intensities of several different regions on the format; and a division region is shown in FIG. 12, and the format may be divided into several regions with an equal area.

At S0032, the minimum format light intensity in the several different regions is used as a reference, and a second grayscale compensation coefficient corresponding to other regions of the format is calculated according to the reference, so as to generate a digital mask.

At S0033, mask compensation is performed, by using the digital mask, on a projection drawing that is projected by the light projector.

As at least one alternative embodiment, in the same format, there may be deviations in the projection energy of the light projector to various regions of the format, which has an impact on printing accuracy, and has further impact on the accurate adjustment of the print size, such that uniformity calibration needs to be performed on the energy of the format. By projecting light on the format, light intensities (which may be detected by using a photometer) of a plurality of different regions on the format is measured; and the minimum light intensity value is then selected from the plurality of regions as the reference, and the second grayscale compensation coefficient corresponding to other regions is calculated according to the reference light intensity value. The product of the second grayscale compensation coefficient and a grayscale value of the projection image may be equivalent to a grayscale value of the projection image under the reference light intensity. The digital mask is generated according to the second grayscale compensation coefficient and position information corresponding to the second grayscale compensation coefficient. Mask compensation is performed, by using the digital mask, on the projection image that is projected by the light projector, so as to obtain a printed image of which exposure surface has uniform light intensity.

In an embodiment, the method for processing the slice image for 3D printing further includes the following steps.

At S0041, a current-optical power curve is determined according to the format light intensities corresponding to different currents of the light projector.

At S0042, the format light intensity is adjusted according to the current-optical power curve.

As at least one alternative embodiment, on the basis of optical uniformity calibration, light intensity calibration is used to calibrate format energy and the corresponding current. The light intensity of the projection format may be detected by inputting different current to the light projector. The ratio of optical power to area is the light intensity, such that the current-optical power curve is obtained as a debugging reference of the optical power. Therefore, when the format light intensity is adjusted, a specific current input value corresponding to the light intensity may be clearly known, such that the control of the format light intensity is more accurate by inputting the current input value to the light projector. The format light intensity refers to the light intensity on the projection format. It is to be noted that, in the method the optical power of the projection format may also be acquired by inputting different currents to the light projector, so as to obtain the current-optical power curve as the debugging reference of the optical power. When the format light intensity is adjusted, the specific current input value corresponding to the light intensity may be clearly known according to the current-optical power curve.

In an embodiment, the method for processing the slice image for 3D printing further includes the following step.

At S004, each slice image is separated to obtain a contour region, and a filling region that is defined in the contour region, and the filling region is segmented into several sub-regions, where there is a gap between the adjacent sub-regions in the same slice image, and the adjacent sub-regions of the adjacent slice images are partially overlapped in a perpendicular direction.

In an embodiment, before the each slice image is separated to obtain the contour region, and the filling region that is defined in the contour region, the method for processing the slice image for 3D printing further includes: slicing the three-dimensional model to generate a series of slice images; and selecting at least two consecutive slice images from the series of slice images.

In an embodiment, the step of separating the slice images to obtain the contour region, and the filling region that is defined in the contour region, and segmenting the filling region into the several sub-regions includes the following operation.

Each of the selected slice images is separated to obtain the contour region, and the filling region that is defined in the contour region, and the filling region is segmented into the several sub-regions.

As at least one alternative embodiment, there may be a non-overlapping relationship between the contour region and the filling region. For example, in one scenario, the contour region and the filling region may be seamlessly spliced, as to form a corresponding slice image.

As at least one alternative embodiment, there may be an overlapping relationship between the contour region and the filling region. For example, the contour region and the filling region are overlapped as to form an overlap area, wherein the width of the overlap area may be 1-10 mm. For example, the width of the overlap area may be 1 mm, 2 mm, 4 mm, 6 mm, 8 mm, 10 mm, etc., which is not limited here. It should be noted that the setting of the overlap area can improve the mechanical performance of the 3D printed object obtained after the final exposure.

For ease of expression, in the following, the initial series of slice images are expressed as the first step slice images, and the segmented slice images are expressed as the second step slice images.

At S005, the contour region and either of the sub-regions and the gaps are used as exposure regions for exposing and curing in 3D printing. It is to be noted that, the processed series of slice images includes the slice images that are subjected to contour region and filling region segmentation, and the slice image that are not subjected to contour region and filling region segmentation.

It is to be noted that, for a molding platform of a printer, since there may be a plurality of printouts on the molding platform, when a light source is exposed each time, an exposure image may be formed by the slice images corresponding to the plurality of printouts. That is, the exposure image is formed by combining a plurality of contour regions and filling regions. Although the solution is described with respect to a single printout, it does not prevent the solution from being used in situations where the plurality of printouts are printed on the same version.

It is understandable by a person skilled in the art that, either the sub-regions or the gaps is used as the exposure region.

In an embodiment, the three-dimensional model is sliced to generate a series of slice images. Then each slice images of the series of slice images are separated to obtain the contour region and the filling region defined in the contour region, and the filling region is segmented into the several sub-regions, where there is a gap between the adjacent sub-regions in the same slice image. Either the sub-regions or the gaps and the contour region of each separated slice image are used as exposure regions for exposing and curing in 3D printing.

In an embodiment, the three-dimensional model is sliced to generate a series of slice images. Then each slice images of the series of slice images are separated to obtain the contour region and the filling region defined in the contour region. Each filling region of at least part of consecutive slice images of the separated slice images is segmented into the several sub-regions, where there is a gap between the adjacent sub-regions in the same slice image. In terms of slice images in which the filling regions are not segmented, the contour region and the filling region are used as exposure regions for exposing and curing in 3D printing. In terms of slice images in which the filling regions are segmented, either the sub-regions or the gaps and the contour region of each separated slice image are used as exposure regions for exposing and curing in 3D printing.

In an embodiment, the three-dimensional model is sliced to generate a series of slice images. Then each of slice images of at least part of consecutive slice images of the series of slice images are separated to obtain the contour region and the filling region defined in the contour region, and the filling region is segmented into the several sub-regions, where there is a gap between the adjacent sub-regions in the same slice image. Either the sub-regions or the gaps and the contour region of each separated slice image are used as exposure regions for exposing and curing in 3D printing. Image region of each slice image which is not separated is used as exposure regions for exposing and curing in 3D printing.

In an embodiment, the three-dimensional model is sliced to generate a series of slice images. Then each of slice images of at least part of consecutive slice images of the series of slice images are separated to obtain the contour region and the filling region defined in the contour region. The contour region and the filling region of each separated slice image are used as exposure regions for exposing and curing in 3D printing. Image region of each slice image which is not separated is used as exposure regions for exposing and curing in 3D printing.

In addition, even for a single printout, the slice images differ from each other. Since the shape of the printout may be irregular, the numbers of light spots between slice layers that are not adjacent to each other may be different. In other words, between the slice layers that are not adjacent to each other, the numbers of combinations of the contour region and the filling region may be different. However, it would have been readily understood by a person skilled in the art that, this does not affect an implementation effect of the solution in this case.

Finally, it would have been readily understood by a person skilled in the art that, for a single combination of the contour region and the filling region, although there is a correspondence relationship between the contour region and the filling region, the number of the contour regions may be different from the number of the filling regions, because the printout may have an outer contour and an inner contour.

As at least one alternative embodiment, before photocuring 3D printing is performed, a three-dimensional data model of a printout to be printed and molded needs to be acquired first. The step may be acquired by means of scanning or modeling, and is not described herein again. Then, the three-dimensional data model is sliced to obtain a plurality of first slice images for exposure molding. However, if the first slice images are directly used, large material contraction and printing residues occur. Therefore, the solution provides a method for pre-processing the slice images, such that when the processed slice images are used for exposure molding, the technical problems can be improved or solved to a certain extent.

Due to the curing characteristic of a photosensitive resin material, if a curing size is larger, contraction is larger. A contour portion of the slice image is separated, an exposure region of the contour becomes thinner and finer and contracts towards a nearby and dense region, and the contraction is reduced. A high-accuracy region finally required by a photocuring 3D printing model is the contour portion; and the value of the filling region is to increase a connection area between layers, so as to improve the firmness of a model structure. There is no hard requirement for accuracy and shapes.

The filling region is divided into several sub-regions, and there is a gap between the adjacent sub-regions. During exposing and curing, one of the sub-regions and the gaps is exposed, and the other is not exposed, so as to form a non-exposure region. The present of the non-exposure region promotes resin flow of photosensitive resin during a layer-by-layer curing process, facilitating spreading of heat generated by the resin in all directions. In addition, the exposure region is separated into several small-area sub-regions, such that a large-area exposure curing region is prevented from continuously releasing heat to cause local overheating of the resin while the contraction is reduced, thereby improving the problem of printing residues.

Meanwhile, the sub-regions of different second step slice images in a perpendicular direction are partially overlapped in space, and partial overlapping is configured to keep the structural strength.

As at least one alternative embodiment, by means of a software algorithm such as an erosion algorithm, the two-dimensional first slice image may be segmented into the contour region and the filling region. The thickness and size of the contour may be freely controlled according to software algorithm parameters.

The embodiments of the disclosure include the following beneficial effects. According to the embodiments of the disclosure, at least two consecutive slice images are separated to obtain the contour region, and the filling region that is defined in the contour region, and the filling region is segmented into several sub-regions, and there is a gap between the adjacent sub-regions in the same slice image, such that the problem of material contraction and printing residues of photocuring 3D printing is solved. Since the adjacent sub-regions of the adjacent slice images are partially overlapped in the perpendicular direction, the firmness of the model structure is improved.

Figure 13:
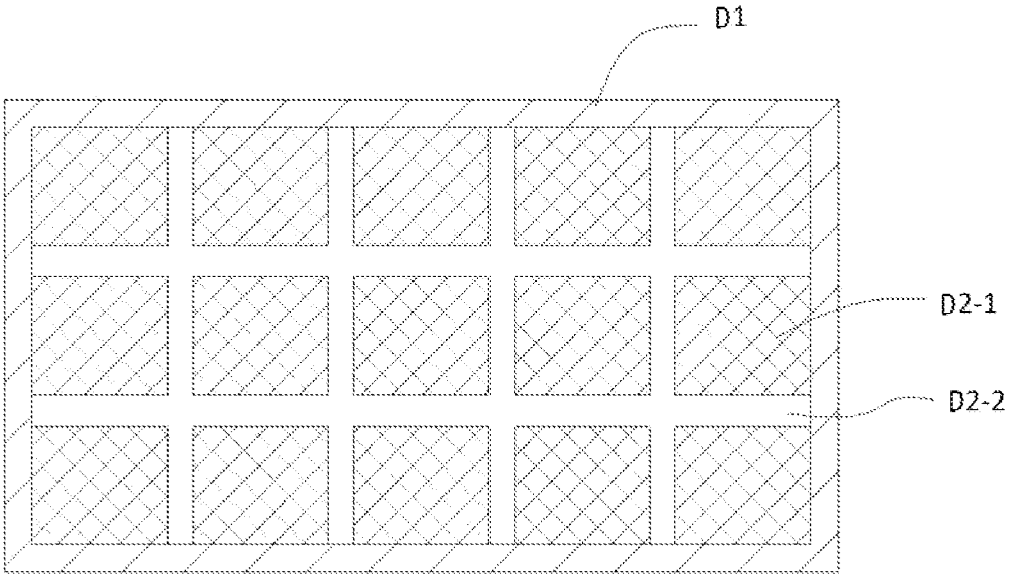
FIG. 13 is a schematic structural diagram of a contour region and a filling region according to an embodiment.

In a specific embodiment, as shown in FIG. 13, D1 is the contour region, D2-1 is the sub-region, and D2-2 is the gap; the sub-region D2-1 and the gap D2-2 jointly form the filling region; the sub-region D2-1 and the contour region D1 are used as the exposure regions; and the gap D2-2 is used as the non-exposure region.

Figure 14:
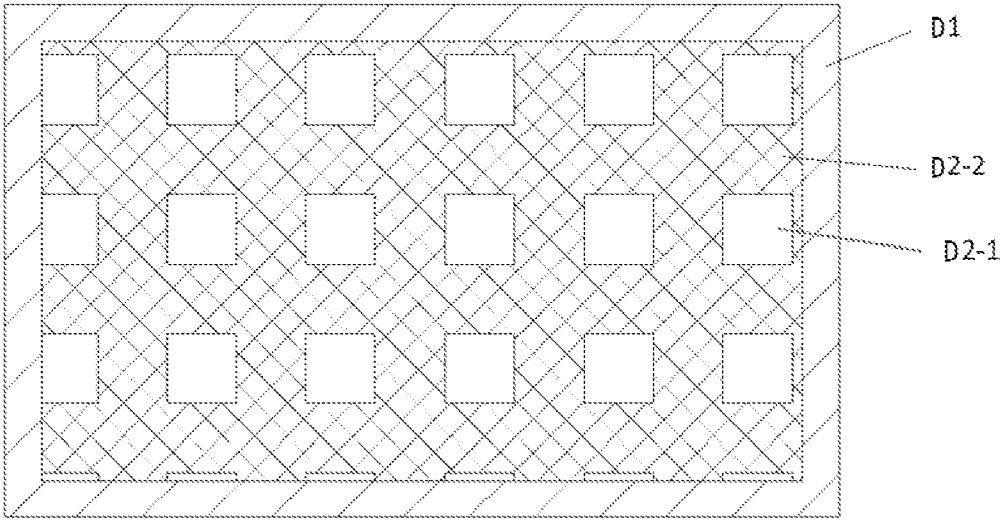
FIG. 14 is a schematic structural diagram of a contour region and a filling region according to another embodiment.

As at least one alternative embodiment, as shown in FIG. 14, D1 is the contour region, D2-1 is the sub-region, and D2-2 is the gap; the sub-region D2-1 and the gap D2-2 jointly form the filling region; the gap D2-2 and the contour region D1 are used as the exposure regions; and the sub-region D2-1 is used as the non-exposure region. In a specific example, the gap D2-2 may be a gap of a net structure, when the gap D2-2 is exposed, interlaced lines that form a net may be exposed.

In an embodiment, the step of segmenting the filling region into the plurality of sub-regions includes: segmenting the filling region into several sub-regions that are in closed shapes.

In an embodiment, the step of segmenting the filling region into the plurality of sub-regions includes: segmenting the filling region into the several sub-regions that have an equal area and are in closed shapes.

In an embodiment, the step of segmenting the filling regions into the several sub-regions may include: segmenting the filling regions into the several sub-regions that are in closed shapes according to at least one of following: features of the filling regions, distances from the contour regions, and a preset performance condition, wherein at least some sub-regions are different on area.

For example, the features of the filling region may be the detailed features of the filling region, such as geometric features. In one application scenario, the filling region is a dumbbell shape with large area changes, wide on both sides and narrow in the middle; In this case, the sub-region located in the large regions on both sides can be set with a larger area, and the sub-region located in the small region in the middle can be set with a smaller area.

Further, the distance from the contour region may refer to the distance from the location of the sub-region to the nearest location of the contour region.

In addition, it should be noted that the different area of the sub-region will lead to different mechanical performance of the final cured object. In this embodiment, the filling region may be segmented into sub-regions with different areas or at least some sub-regions with different areas based on preset performance conditions.

As at least one alternative embodiment, the closed shape includes a rectangular shape, a square shape, a triangular shape, or a circular shape. In this embodiment of the present application, the square shape is selected. As shown in FIG. 13, the square sub-regions are distributed in the filling region in the form of matrix arrangement.

It is to be noted that, due to the presence of the gaps, the sub-regions are not connected to each other, and there may be a gap even between the sub-region and the contour region. In addition, it is understandable that, the filling region is defined in the contour region, such that the filling region is bounded, and the shape of the sub-region close to a boundary may be in an incomplete square shape. In other words, for example, the closed shapes of the sub-regions are the square shapes, the sub-regions include complete square sub-regions that are densely distributed in the filling region and incomplete square sub-regions that are distributed close to the boundary of the filling region.

In an embodiment, the adjacent sub-regions of the adjacent slice images are partially overlapped in the perpendicular direction by means of the following step.

The sub-regions of the adjacent slice images at the same position in the perpendicular direction are offset by a preset distance along a preset direction.

Figure 15:
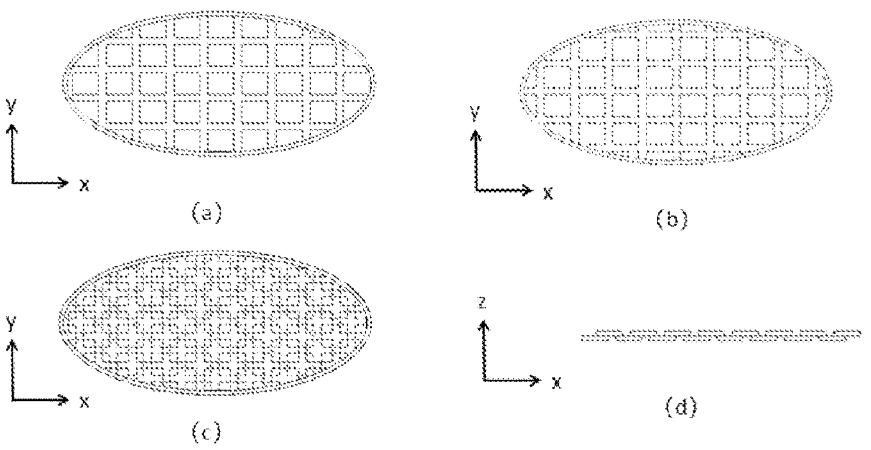
FIG. 15 is a schematic structural diagram of adjacent sub-regions of adjacent second step slice images according to an embodiment.

As at least one alternative embodiment, as shown in FIG. 15, FIG. 15*a* is a top view of an ith layer slice image on an x-y plane, where i is an integer; and FIG. 15*b* is a top view of an (i+1)th layer slice image on the x-y plane. Compared with the positions of square sub-regions in the ith layer slice image, the positions of square sub-regions in the (i+1)th layer slice image "offset". It is to be noted that, the contour region is the boundary of the sub-regions (filling region), and does not offset with the sub-regions. As at least one alternative embodiment, for the slice images of two layers, a mesh array (that is, the square sub-regions in matrix arrangement) in the contour region shows an offset effect. As at least one alternative embodiment, referring to FIG. 15*c* and FIG. 15*d*, FIG. 15*c* is a top view of ith and (i+1)th layer slice images overlapping on the x-y plane; and FIG. 15*d* is a cross-sectional view of the ith and (i+1)th layer slice images on the x-y plane. In the adjacent two-layer slice images, the adjacent square sub-regions in the perpendicular direction are overlapped with each other. That is, the sub-regions of the ith layer is overlapped with the sub-regions of the (i+1)th layer adjacent to the ith layer in the perpendicular direction. It may be seen from FIG. 15 that, dislocation overlapping across layers occurs among the squares, and the square of the next layer covers the gap of the square of the previous layer.

In an optional embodiment, a position offset may be set to a cyclic mode. For example, after a four-layer cyclic offset, the square returns to its original position. The position offset may be realized by means of various forms of offset cyclic lists, and the present application is not specifically limited thereto. In one of the embodiments, as a print layer thickness increases, the number of times of a cycle required for the square to return to its original position is decreased.

In an embodiment, the method for processing the slice image for 3D printing further includes the following operation.

Model outer surface identification is performed on a series of two-dimensional second step slice images.

That is to say, if the current second step slice image has an exposed filling region compared to the first several or last several slice images of the current second step slice image, the exposed filling region is determined as a model outer surface region, and sub-region segmentation is not performed on the model outer surface region.

As at least one alternative embodiment, algorithm verification is performed on each two-dimensional exposure full image; a model outer surface is indirectly identified; if the current slice image has an excess portion compared to the first m slice images or the last m slice images, the excess portion is not subjected to an operation of "segmenting the filling region into several sub-regions". In this way, meshes may be prevented from appearing on a model surface to affect a surface printing effect.

By using the nth slice exposure full image as an example, a comparison operation is performed on the first m and the last m exposure full images, so as to find an excess exposure portion of the nth image compared to the first and last m images; and when mesh processing is performed on a filling portion of the nth exposure image, the excess exposure portion is ignored, so as to ensure that the exposure portion is not subjected to mesh division processing when being used as an outer surface, thereby indirectly achieving an outer surface identification result.

Figure 16:
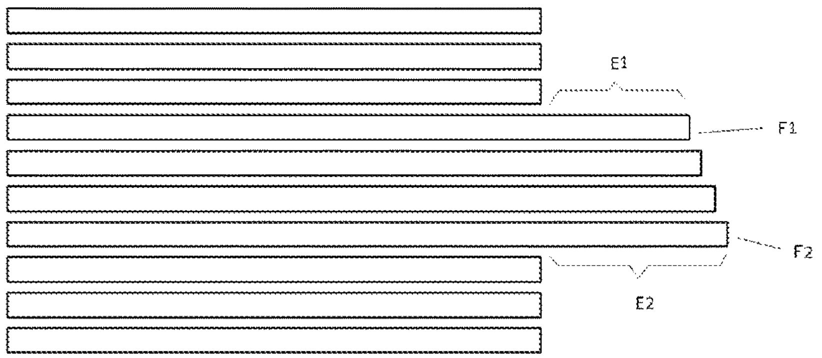
FIG. 16 is a schematic diagram of a cross-sectional structure of a three-dimensional model having an exposed region according to an embodiment.

As at least one alternative embodiment, as shown in FIG. 16, an F1 layer of the nth layer has an exposed region E1 compared to the first 3 layers, and the exposed region E1 is not subjected to the operation of "segmenting the filling region into several sub-regions". Likewise, an F2 layer of the n'th layer has an exposed region E2 compared to the last 3 layers, and the exposed region E2 is not subjected to the operation of "segmenting the filling region into several sub-regions".

It is to be noted that, when the sub-regions and the gaps are divided sufficiently small, even if outer surface identification is not performed, surface meshes of a printed model may be invisible.

In an embodiment, the method for processing the slice image for 3D printing further includes the following operation.

A curing depth of the contour region is set to be greater than or equal to a curing depth of the filling region.

In this implementation, increasing the curing depth of the contour region may improve the mechanical properties of parts to a certain extent.

As at least one alternative embodiment, for a photocuring printing method of face exposure, on the one hand, the contour region and the filling region may be separately cured, but the exposure energy of the contour region may be different from that of the filling region, which may be realized by differentiating the grayscale, exposure intensity, or exposure duration of the contour region and the filling region; and on the other hand, the contour region and the filling region may be cured at the same time, but the exposure intensity and/or exposure time of the contour region may be greater than that of the filling region.

As at least one alternative embodiment, the method for processing the slice image for 3D printing further includes: controlling a light projector to expose based on the contour region and the filling region of the each slice image. For example, controlling a light projector to expose based on the contour region and the filling region of the each slice image may include one of following: exposing the contour region firstly, then exposing the filling region; exposing the filling region firstly, then exposing the contour region; exposing the filling region and the contour region at the same time. The exposure order of the contour region and the filling region of the same slice image may be set according to the actual requirement, and there is no limit here.

For a point light source type photocuring used in the method for processing the slice image for 3D printing, for example, Stereo lithography Apparatus (SLA) photocuring printing, the speed of laser scanning or spot sizes may be controlled.

Figure 17:
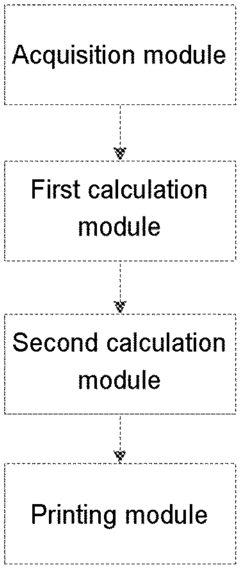
FIG. 17 is a structural block diagram of a system for processing a slice image for 3D printing according to an embodiment.

Alternatively, the contour region and the filling region may be cured by using different light sources; the type of the light sources may be the same or different; and when the light sources are different, the contour region may correspond to a point light source-laser light source, and the filling region may correspond to a face light source. In this embodiment of the disclosure, the described face light source includes, but is not limited to, a Digital Light Processing (DLP) light source, a Liquid Cristal Display (LCD) light source, or a Liquid Crystal on Silicon (LCOS) light source, and the like. As shown in FIG. 17, an embodiment of the disclosure provides a system for processing a slice image for 3D printing. The system includes an acquisition module, a first calculation module, a second calculation module, and a printing module.

The acquisition module is configured to acquire a slice image of a three-dimensional model, and a relationship between a grayscale compensation parameter and a size adjustment value.

The first calculation module is configured to determine a size adjustment value according to the slice image.

The second calculation module is configured to determine a grayscale compensation parameter according to the size adjustment value and the relationship between the grayscale compensation parameter and the size adjustment value.

The printing module is configured to respectively perform grayscale processing on edge pixels of a contour in the slice image according to the grayscale compensation parameter, where the processed slice image is used for 3D printing.

It may be seen that, the content in the above method embodiments is applicable to the present system embodiments. The functions specifically realized by the present system embodiments are the same as those of the above method embodiments. The beneficial effects achieved are the same as the beneficial effects achieved by the above method embodiments.

An embodiment of the disclosure provides a 3D printing method.

The method includes the method for processing the slice image for 3D printing in any one of the above embodiments.

The method further includes: performing 3D printing on a processed slice image.

Figure 18:
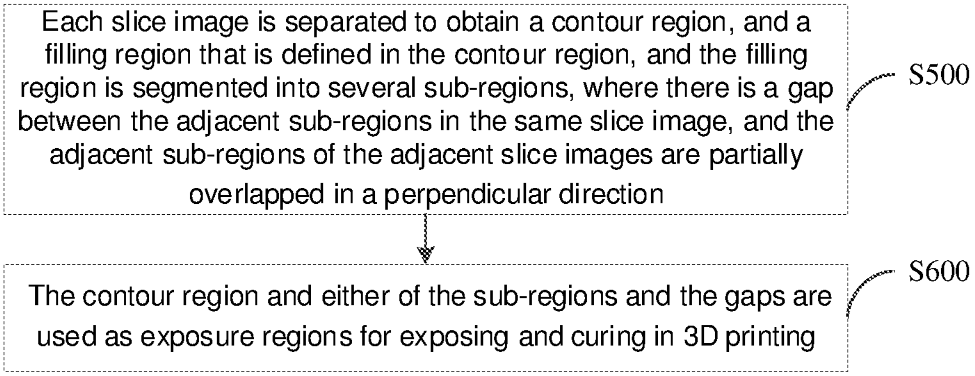
FIG. 18 is a schematic diagram of a step process of a method for processing a slice image for 3D printing according to another embodiment.

As shown in FIG. 18, an embodiment of the disclosure provides a method for processing a slice image for 3D printing. The method includes the following steps, which are shown as follows.

At S500, each slice image is separated to obtain a contour region, and a filling region that is defined in the contour region, and the filling region is segmented into several sub-regions, where there is a gap between the adjacent sub-regions in the same slice image, and the adjacent sub-regions of the adjacent slice images are partially overlapped in a perpendicular direction.

In an optional embodiment, before the each slice image is separated to obtain the contour region, and the filling region that is defined in the contour region, the method for processing the slice image for 3D printing further includes: slicing the three-dimensional model to generate a series of slice images; and selecting at least two consecutive slice images from the series of slice images.

In an optional embodiment, the step of separating the slice images to obtain the contour region, and the filling region that is defined in the contour region, and segmenting the filling region into the several sub-regions includes the following operation.

Each of the selected slice images is separated to obtain the contour region, and the filling region that is defined in the contour region, and the filling region is segmented into the several sub-regions.

For ease of expression, in the following, the initial series of slice images is expressed as the first step slice images, and the segmented slice images are expressed as the second step slice images.

At S600, the contour region and either of the sub-regions and the gaps are used as exposure regions for exposing and curing in 3D printing. It is to be noted that, the processed series of slice images includes the slice images that are subjected to contour region and filling region segmentation, and the slice image that are not subjected to contour region and filling region segmentation.

In an embodiment, before the each slice image is separated to obtain the contour region, and the filling region that is defined in the contour region, the method for processing the slice image for 3D printing further includes: slicing the three-dimensional model to generate a series of slice images; and selecting at least two consecutive slice images from the series of slice images.

In an embodiment, the three-dimensional model is sliced to generate a series of slice images. Then each slice images of the series of slice images are separated to obtain the contour region and the filling region defined in the contour region, and the filling region is segmented into the several sub-regions, where there is a gap between the adjacent sub-regions in the same slice image. Either the sub-regions or the gaps and the contour region of each separated slice image are used as exposure regions for exposing and curing in 3D printing.

In an embodiment, the three-dimensional model is sliced to generate a series of slice images. Then each slice images of the series of slice images are separated to obtain the contour region and the filling region defined in the contour region. Each filling region of at least part of consecutive slice images of the separated slice images is segmented into the several sub-regions, where there is a gap between the adjacent sub-regions in the same slice image. In terms of slice images in which the filling regions are not segmented, the contour region and the filling region are used as exposure regions for exposing and curing in 3D printing. In terms of slice images in which the filling regions are segmented, either the sub-regions or the gaps and the contour region of each separated slice image are used as exposure regions for exposing and curing in 3D printing.

In an embodiment, the three-dimensional model is sliced to generate a series of slice images. Then each of slice images of at least part of consecutive slice images of the series of slice images are separated to obtain the contour region and the filling region defined in the contour region, and the filling region is segmented into the several sub-regions, where there is a gap between the adjacent sub-regions in the same slice image. Either the sub-regions or the gaps and the contour region of each separated slice image are used as exposure regions for exposing and curing in 3D printing. Image region of each slice image which is not separated is used as exposure regions for exposing and curing in 3D printing.

In an embodiment, the three-dimensional model is sliced to generate a series of slice images. Then each of slice images of at least part of consecutive slice images of the series of slice images are separated to obtain the contour region and the filling region defined in the contour region. The contour region and the filling region of each separated slice image are used as exposure regions for exposing and curing in 3D printing. Image region of each slice image which is not separated is used as exposure regions for exposing and curing in 3D printing.

In an embodiment, the step of separating the slice images to obtain the contour region, and the filling region that is defined in the contour region, and segmenting the filling region into the several sub-regions includes the following operation.

Each of the selected slice images is separated to obtain the contour region, and the filling region that is defined in the contour region, and the filling region is segmented into the several sub-regions.

In an embodiment, the step of segmenting the filling region into the plurality of sub-regions includes: segmenting the filling region into several sub-regions that are in closed shapes.

In an embodiment, the step of segmenting the filling region into the plurality of sub-regions includes: segmenting the filling region into the several sub-regions that have an equal area and are in closed shapes.

In an embodiment, the adjacent sub-regions of the adjacent slice images are partially overlapped in the perpendicular direction by means of the following step.

The sub-regions of the adjacent slice images at the same position in the perpendicular direction are offset by a preset distance along a preset direction.

In an embodiment, the method for processing the slice image for 3D printing further includes the following operation.

If the current slice image has an exposed filling region compared to the first several or last several slice images of the current slice image, the exposed filling region is determined as a model outer surface region, and sub-region segmentation is not performed on the model outer surface region.

In an embodiment, the method for processing the slice image for 3D printing further includes the following operation.

A curing depth of the contour region is set to be greater than or equal to a curing depth of the filling region.

Figure 19:
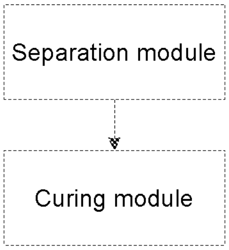
FIG. 19 is a structural block diagram of a system for processing a slice image for 3D printing according to another embodiment.

As shown in FIG. 19, an embodiment of the disclosure provides another system for processing a slice image for 3D printing. The system includes a separation module and a curing module.

The separation module is configured to separate each slice image to obtain a contour region, and a filling region that is defined in the contour region, and segment the filling region into several sub-regions, where there is a gap between the adjacent sub-regions in the same slice image, and the adjacent sub-regions of the adjacent slice images are partially overlapped in a perpendicular direction.

The curing module is configured to use the contour region and either of the sub-regions and the gaps as exposure regions for exposing and curing in 3D printing.

Figure 20:
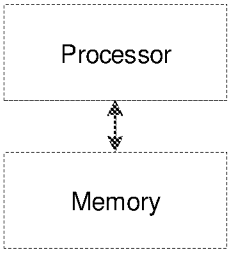
FIG. 20 is a structural block diagram of an apparatus for processing a slice image for 3D printing according to an embodiment.

As shown in FIG. 20, an embodiment of the disclosure provides an apparatus for processing a slice image for 3D printing. The apparatus includes at least one processor and at least one memory.

The at least one memory is configured to store at least one program.

When the at least one program is executed by the at least one processor, the at least one processor is enabled to implement the method for processing the slice image for 3D printing.

It may be seen that, the content in the above method embodiments is applicable to the present apparatus embodiments. The functions specifically realized by the present apparatus embodiments are the same as those of the above method embodiments. The beneficial effects achieved are the same as the beneficial effects achieved by the above method embodiments.

In addition, an embodiment of the present application further discloses a computer program product or a computer program. The computer program product or the computer program is stored in a computer-readable storage medium. The processor of a computer device may read the computer program from the computer-readable storage medium. The processor executes the computer program, such that the computer device is enabled to execute the above 3D printing method. Similarly, the content in the above method embodiments is applicable to the present storage medium embodiments. The functions specifically realized by the present storage medium embodiments are the same as those of the above method embodiments. The beneficial effects achieved are the same as the beneficial effects achieved by the above method embodiments.

Figure 21:
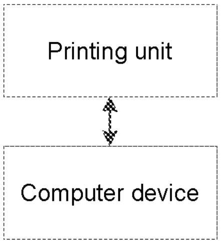
FIG. 21 is another structural block diagram of a system for processing a slice image for 3D printing according to an embodiment.

As shown in FIG. 21, an embodiment of the disclosure provides a system for processing a slice image for 3D printing. The system includes a printing unit and a computer device connected to the printing unit.

The printing unit is configured to print a three-dimensional model according to an instruction. The computer device includes at least one processor and at least one memory.

The at least one memory is configured to store at least one program.

When the at least one program is executed by the at least one processor, the at least one processor is enabled to implement the method for processing the slice image for 3D printing.

As at least one alternative embodiment, the computer device may be electronic devices of different types, and includes, but is not limited to, terminals such as a desktop computer and a laptop computer. It may be seen that, the content in the above method embodiments are applicable to the present system embodiments. The functions specifically realized by the present system embodiments are the same as those of the above method embodiments. The beneficial effects achieved are the same as the beneficial effects achieved by the above method embodiments.

The preferred embodiments of the disclosure are described in detail above, but the disclosure is not limited to the described embodiments. Those skilled in the art can make various equivalent modifications or replacements without departing from the spirit of the disclosure. These equivalent modifications or replacements all fall in the scope defined by the claims of this application.

INDUSTRIAL APPLICABILITY

The solutions provided in the embodiments of the disclosure may be applied to the technical field of 3D printing. In the embodiments of the disclosure, the slice image of the three-dimensional model, and the relationship between the grayscale compensation parameter and the size adjustment value are acquired; the size adjustment value is determined according to the slice image; the grayscale compensation parameter is determined according to the size adjustment value and the relationship between the grayscale compensation parameter and the size adjustment value; and grayscale processing is respectively performed on edge pixels of contours in the slice image according to the grayscale compensation parameter, and the processed slice image is used for 3D printing. By means of the embodiments of the disclosure, an accurate size adjustment requirement may be met by compensating the edge pixels of the slice image, such that the disclosure may be widely applied to the technical field of 3D printing.

What is claimed is:

1. A method for processing a slice image for 3D printing, comprising:

separating each slice image to obtain a contour region, and a filling region that is defined in the contour region, and segmenting the filling region into several sub-regions, wherein there is a gap between adjacent sub-regions in the same slice image, and the adjacent sub-regions of adjacent slice images are partially overlapped in a perpendicular direction by offsetting, by a preset distance, the sub-regions of the adjacent slice images at the same position in the perpendicular direction along a preset direction; and using the contour region and either of the sub-regions and the gaps as exposure regions for exposing and curing in 3D printing.

2. The method for processing the slice image for 3D printing as claimed in claim 1, wherein before the slice images are separated to obtain the contour region, and the filling region that is defined in the contour region, the method for processing the slice image for 3D printing further comprises:

slicing a three-dimensional model to generate a series of slice images; and selecting at least two consecutive slice images from the series of slice images; and separating the slice images to obtain the contour region, and the filling region that is defined in the contour region, and segmenting the filling region into the several sub-regions comprises:

separating the selected slice images to obtain contour regions, and filling regions that are defined in the contour regions, and segmenting the filling regions into the several sub-regions.

3. The method for processing the slice image for 3D printing as claimed in claim 1, wherein before the slice images are separated to obtain the contour region, and the filling region that is defined in the contour region, the method for processing the slice image for 3D printing further comprises:

slicing a three-dimensional model to generate a series of slice images;

separating the slice images to obtain the contour region, and the filling region that is defined in the contour region, and segmenting the filling region into the several sub-regions comprises:

separating each slice image of the series of slice images to obtain the contour region, and filling region that are defined in the contour region, and segmenting the filling region into the several sub-regions.

4. The method for processing the slice image for 3D printing as claimed in claim 1, wherein the contour region and the filling region are overlapped as to form an overlap area, and a width of the overlap area is 1-10 mm; or the contour region and the filling region are non-overlapped with each other.

5. The method for processing the slice image for 3D printing as claimed in claim 1, wherein segmenting the filling regions into the several sub-regions comprises: segmenting the filling regions into the several sub-regions that are in closed shapes.

6. The method for processing the slice image for 3D printing as claimed in claim 5, wherein segmenting the filling regions into the several sub-regions comprises: segmenting the filling regions into the several sub-regions that have an equal area and are in closed shapes.

7. The method for processing the slice image for 3D printing as claimed in claim 6, wherein segmenting the filling regions into the several sub-regions comprises: segmenting the filling regions into the several sub-regions that are in closed shapes according to at least one of following: features of the filling regions, distances from the contour regions, and a preset performance condition;

wherein areas of at least part of the sub-regions are different from each other.

8. The method for processing the slice image for 3D printing as claimed in claim 6, wherein the several sub-regions obtained by segmenting the filling regions comprise: complete square sub-regions that are distributed in the filling regions and incomplete square sub-regions that are distributed close to a boundary of the filling regions.

9. The method for processing the slice image for 3D printing as claimed in claim 6, wherein the contour region is a boundary of the sub-regions, and does not offset with the sub-regions.

10. The method for processing the slice image for 3D printing as claimed in claim 1, wherein a position offset is set to a cyclic mode, wherein the cyclic mode refers to that as a print layer thickness increases, the number of times of a cycle required for a square to return to an original position is decreased.

11. The method for processing the slice image for 3D printing as claimed in claim 1, further comprising:

if the current slice image has an exposed filling region compared to the first several or last several slice images of the current slice image, determining the exposed filling region as a model outer surface region, and not performing sub-region segmentation on the model outer surface region.

12. The method for processing the slice image for 3D printing as claimed in claim 1, further comprising:

setting a curing depth of the contour region to be greater than or equal to a curing depth of the filling region.

13. The method for processing the slice image for 3D printing as claimed in claim 1, further comprising:

controlling a light projector to expose based on the contour region and the filling region of the each slice image.

14. The method for processing the slice image for 3D printing as claimed in claim 13, controlling the light projector to expose based on the contour region and the filling region of the each slice image comprises one of following:

exposing the contour region firstly, then exposing the filling region;

exposing the filling region firstly, then exposing the contour region;

exposing the filling region and the contour region at the same time.

15. The method for processing the slice image for 3D printing as claimed in claim 14, wherein when exposing the filling region and the contour region at the same time, an exposure intensity and/or exposure time of the contour region is greater than that of the filling region.

16. The method for processing the slice image for 3D printing as claimed in claim 14, wherein the filling region and the contour region are cured by using different light sources.

17. The method for processing the slice image for 3D printing as claimed in claim 16, wherein the different light sources comprises a point light source corresponding to the contour region and a face light source corresponding to the filling region.

18. A non-transitory storage medium, storing a program that is executable by a processor, wherein, when being executed by the processor, the program executable by the processor is configured to execute following actions:

separating each slice image to obtain a contour region, and a filling region that is defined in the contour region, and segmenting the filling region into several sub-regions, wherein there is a gap between adjacent sub-regions in the same slice image, and the adjacent sub-regions of adjacent slice images are partially overlapped in a perpendicular direction by offsetting, by a preset distance, the sub-regions of the adjacent slice images at the same position in the perpendicular direction along a preset direction; and using the contour region and either of the sub-regions and the gaps as exposure regions for exposing and curing in 3D printing.

19. A system for processing a slice image for 3D printing, comprising a printing unit and a computer device connected to the printing unit, wherein the printing unit is configured to print a three-dimensional model according to an instruction;

the computer device comprises:

at least one processor, and at least one memory, configured to store at least one program; and when the at least one program is executed by the at least one processor, the at least one processor is enabled to implement following actions:

separating each slice image to obtain a contour region, and a filling region that is defined in the contour region, and segmenting the filling region into several sub-regions, wherein there is a gap between adjacent sub-regions in the same slice image, and the adjacent sub-regions of adjacent slice images are partially overlapped in a perpendicular direction by offsetting, by a preset distance, the sub-regions of the adjacent slice images at the same position in the perpendicular direction along a preset direction; and using the contour region and either of the sub-regions and the gaps as exposure regions for exposing and curing in 3D printing.

* * * * *